United States Patent [19]
Comroe et al.

[11] Patent Number: 5,218,716
[45] Date of Patent: Jun. 8, 1993

[54] METHOD FOR LOCATING A COMMUNICATION UNIT WITHIN A MULTI MODE COMMUNICATION SYSTEM

[75] Inventors: Richard A. Comroe, Dundee; Gary W. Grube, Palatine, both of Ill.

[73] Assignee: Motorola, Inc., Schaumburg, Ill.

[21] Appl. No.: 608,873

[22] Filed: Nov. 5, 1990

[51] Int. Cl.$^5$ .............................................. H04Q 7/00
[52] U.S. Cl. .................................. 455/33.4; 455/54.2; 455/56.1; 379/59
[58] Field of Search ....................... 455/33, 53, 54, 56, 455/33.1, 33.4, 53.1, 54.1, 54.2, 56.1; 379/59, 60

[56] References Cited

U.S. PATENT DOCUMENTS

| | | | |
|---|---|---|---|
| 4,553,262 | 11/1985 | Coe ........................................ | 455/54 |
| 4,654,879 | 3/1987 | Goldman et al. ........................ | 455/54 |
| 4,670,899 | 6/1987 | Brody et al. ............................. | 455/56 |
| 4,680,786 | 7/1987 | Baker et al. ............................. | 379/60 |
| 4,737,978 | 4/1988 | Burke et al. ............................. | 455/33 |
| 5,054,110 | 10/1991 | Comroe et al. ......................... | 455/54 |

FOREIGN PATENT DOCUMENTS 0038940 2/1985 Japan ...................................... 455/54

Primary Examiner—Reinhard J. Eisenzopf
Assistant Examiner—Edward Urban
Attorney, Agent, or Firm—Timothy W. Markison; Steven G. Parmelee

[57] ABSTRACT

In a geographic region that contains a trunking communication system and a cellular communication system, wherein the coverage area of the trunking system and cellular communication system substantially overlap and wherein some communication units are located within the geographic region, a method is disclosed for a trunking communication system to locate a particular communication unit. In order to locate a particular communication unit, a communication channel controller of the trunking communication system transmits a location request to the particular communication unit. Upon receiving the location request, the particular communication unit transfers its affiliation from the trunked communication system to the cellular communication system. Once affiliated with the cellular communication system, the particular communication unit transmits a location message to the communication channel controller via the cellular communication system. The location message received by the communication channel controller can be deciphered to determine the cell of the cellular communication system that the communication is located in.

3 Claims, 2 Drawing Sheets

METHOD FOR LOCATING A COMMUNICATION UNIT WITHIN A MULTI MODE COMMUNICATION SYSTEM

TECHNICAL FIELD

This invention relates generally to communication systems and in particular to a method for a trunking communication system to utilize the advantages of a cellular telephone communication system in locating a particular communication unit.

BACKGROUND OF THE INVENTION

The basic operation and structure of trunking communication systems and cellular telephone communication systems (cellular communication systems) are known. Trunking communication systems typically comprise a communication channel controller, a limited number of repeaters that transceive information via communication channels, and a plurality of communication units which may be mobile vehicle radios and/or portable radios. Of the communication channels, one is typically chosen to be a control channel. The control channel typically transceives operational information between the communication channel controller and the plurality of communication units such that, for example, the plurality of communication units can access the communication channels. Typically, the trunking communication system has a relatively large geographic coverage area, depending on the environment that the trunking communication system is located, the coverage area may be approximately 35 miles in diameter.

A cellular communication system typically comprises a mobile telephone switching office (MTSO), a plurality of cells, a limited number of communication channels, and a plurality of communication units which may be cellular telephones. Each of the plurality of cells comprises some of the limited number of communication channels, wherein one of the communication channels is designated as the control channel for that cell. The control channel transceives operational information between the plurality of communication units within the cell and the MTSO such that the communication units can place telephone calls via a phone system. Typically, the coverage area of each cell is relatively small in comparison with that of a typical trunking system. For example, a typical cell coverage area is approximately two miles in diameter. Because an individual cell coverage area is relatively small, the communication channels may be reused, at least once, within a geographic region of approximately the same size as a trunking communication system.

In many instances, it is desirable for an operator of a console within the trunking communication system to locate a particular communication unit. Presently, automatic vehicle location (AVL) systems exist. To operate in these systems, communication units are typically equipped with at least a second transmitter. The second transmitter, upon receipt of a prompt, transmits, usually via satellite, a message that can be decoded to determine the communication unit's location. The AVL system accurately locates a communication unit, but requires an additional transmitter in each communication unit and a subscription to the satellite, both adding cost to the communication unit and the system.

Another method is the Coast Guard Loran-C system, or similar system, which comprises three beacon signals. A communication unit receives all three signals, and based upon the different times the signals are received, an exact location of the communication unit can be determined. This method also requires that a communication unit have an additional receiver to receive the beacon signals. Yet another location method is available in trunking communication system networks. A communication unit within the trunking communication system network can be located within the nearest trunking communication system. However, in many applications, the accuracy of the Loran-C location system is not need, yet the location system of a trunking communication system network is not accurate enough. Therefore a need exists for a relatively accurate communication unit location method that does not require the communication unit to include an additional receiver, a subscription to a satellite, or complexed location decompilers.

SUMMARY OF THE INVENTION

These needs and others are substantially met by the method for locating a communication unit within a multi-mode communication system as disclosed herein. In a geographic region that contains a trunking communication system and a cellular communication system, wherein the cellular communication system and the trunking communication system have substantially overlapping coverage areas, wherein the trunking communication system is operably coupled to the cellular communication system, wherein at least some a plurality of communication units are located within the geographic region, and wherein at least some of the communication units are affiliated with the trunking communication system and are operable in either the trunking communication system or the cellular communication, a method for locating a particular communication unit. The method comprises the steps of transmitting, by a communication channel controller of the trunking communication system, a location request message to a particular communication unit. When the particular communication unit receives the location request message, it transfers its affiliation from the trunking communication system to the cellular communication system. Once the communication unit is affiliated with the cellular communication system, it transmits a location message to the communication channel controller via the cellular communication system.

In an aspect of the present invention, the communication unit, after transmitting the location message, transfers its affiliation back to the trunking communication system.

DESCRIPTION OF A PREFERRED EMBODIMENT

Figure 1:
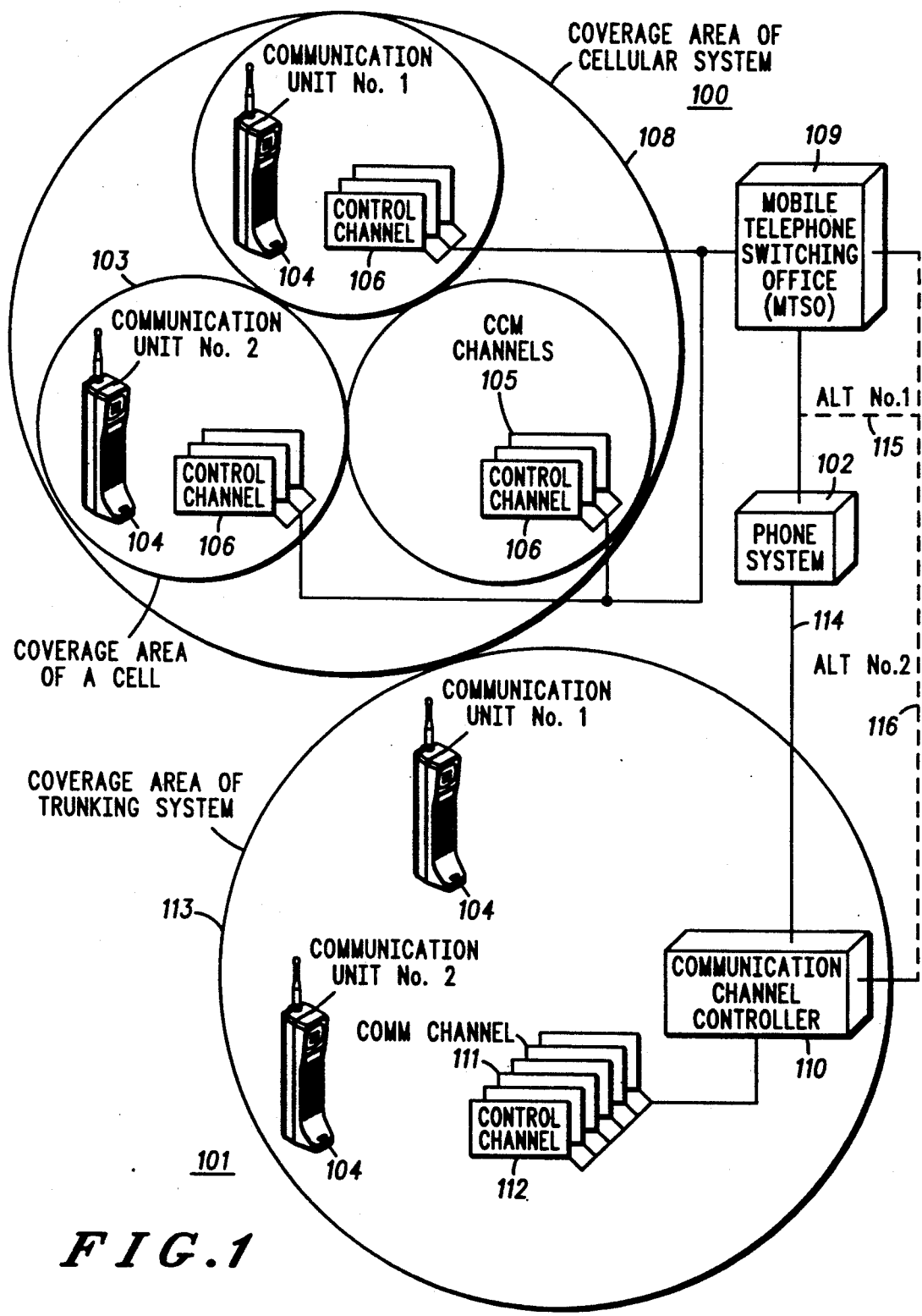
FIG. 1 illustrates a cellular communication system and a trunked communication system each having substantially the same coverage areas in accordance with the present invention.

FIG. 1 illustrates a trunking communication system (101) and a cellular communication system (100) operably coupled together in accordance with the present invention. The cellular communication system (100) comprises a mobile telephone switching office (MTSO) (109) and a plurality of cells (103) (3 shown), where each cell is operably coupled to the MTSO (109) and has a specific coverage area (107). Each cell comprises a limited number of communication channels (105), which may be carrier frequencies, frequency pairs, and-/or time division multiplexing (TDM) slots, wherein one of the communication channels is designated a control channel (106). The summation of the coverage areas of each cell (107) comprises the coverage area of the cellular communication system (108). The cellular communication system also comprises a plurality of communication units (2 shown), where the communication units are equipped with one receiver and transmitter that has adequate bandwidth to operate in both the trunking communication system and the cellular communication system.

The trunking communication system (101) comprises a communication channel controller (110), a plurality of communication channels (111), wherein one of the communication channels is designated a control channel (112), and the plurality of communication units (104). The coverage area of the trunking communication system (113) substantially overlaps, and may be approximately equal to, the coverage area of the cellular communication system (108), however, for illustrative purposes the coverage areas are shown separately.

The trunking communication system (101) is operably coupled to the cellular communication system by one of three methods. The first and most convenient method, especially when the communication systems are manufactured by different manufacturers, is to couple the systems together through a phone line (114) or a plurality of phone lines, to a phone system (102). This coupling method allows the trunking communication system to transfer messages to the cellular communication system by placing telephone calls to the cellular communication system via the telephone system (102). An alternative method, is to directly connect the communication channel controller (110) to the MTSO (109) by a direct connection (116). Finally, if the communication systems are manufactured by the same manufacturer, or an agreement exists between manufacturers, the communication channel controller (110) may be coupled directly into the communication channel links (117) of the cellular communication system by a coupling link (115) that is similar to a telephone link.

Generally, when it's desired to locate a particular communication unit, the communication channel controller (110) of the trunking communication system instructs the communication unit to transfer its affiliation from the trunking communication system to the cellular communication system. Once the communication unit is affiliated with the cellular communication system, it transmits, via the cellular communication system, a data packet to the communication channel controller, where the data packet indicates which cell that the communication unit is in. Based on the particular cell that the communication unit is in, the communication channel controller can determine the particular communication unit's approximate location.

Figure 2:
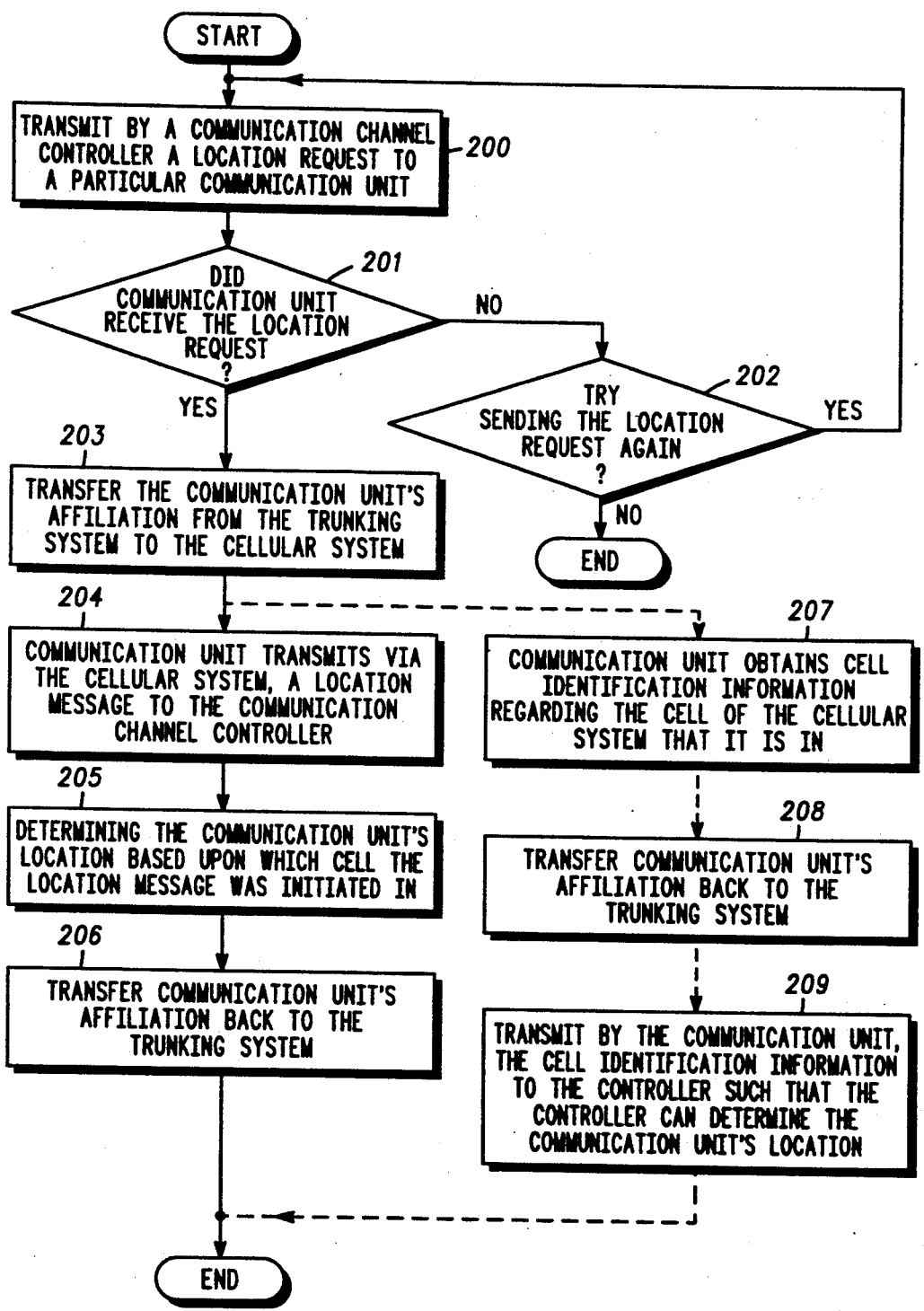
FIG. 2 illustrates a logic diagram that may be used to implement the present invention.

FIG. 2 illustrates a logic diagram of the present invention. At step (200), the communication channel controller (110) transmits a location request to a particular communication unit. The location request basically instructs the communication unit to transfer its affiliation from the trunking communication system to the cellular communication system and to obtain data regarding the particular cell that it is located in. If the communication unit did not receive the location request (201), the communication channel controller (110) may retransmit the location request (202), or it may end the process. The communication unit may not receive the location request because it may be out of range of the trunking communication system or that it may be off.

If the communication unit receives the location request (201), the communication unit transfers its affiliation from the trunking communication system to the cellular communication system. The transferring of a communication unit's affiliation comprises changing a local oscillator such that the receiver and transmitter of the communication unit are operable in the cellular region. Transferring affiliation back to the trunking communication system comprises basically the same process. Once the communication unit is affiliated with the cellular communication system, it transmits a location message to the communication channel controller via the cellular communication system. This can be done by placing a telephone call from the communication unit, using a special identification number or phone number, to the communication channel controller. Once the communication channel controller (110) receives the location message, it can determine, based upon the information within the location message, the communication unit's approximate location (205). The communication channel controller (110) comprises a dynamic database that contains the frequency of each control channel of the cells in the communication system, the geographic location of each cell, and may also contain a color code of each cell. For cellular communication systems, each cell within a reuse pattern uses different frequencies as the control channel and communication channels. In addition, each reuse pattern of cells may be given one of four color codes to further distinguish cells from one another. Thus, for example, if a 12 cell reuse pattern is used having four color codes, 48 different cell frequency/color code combinations can be uniquely identified. From the database, the communication channel controller can determine the cell that the communication unit is located in. Once the communication channel controller has determined the approximate location of the communication unit, the communication unit transfers its affiliation back to the trunking system.

An alternative location method comprises steps 200 through 203 as described above, and further includes steps 207 through 209. At step 207, after transferring the communication unit's affiliation from the trunking communication system to the cellular communication system, the communication unit obtains cell identification information, same information as obtained in a location message described above, regarding the particular cell of the cellular communication system that it is in (207). Once the communication unit obtains the cell identification information, it transfers its affiliation back to the trunking communication system (208). Once the communication unit is affiliated with the trunking communication system, it transfers the cell identification information to the communication channel controller such that it can determine which cell the communication unit is located in. This alternative method requires no interconnection between the trunking communication system and the cellular communication system, the only requirement is that the bandwidth of the receiver of the communication unit be sufficient such that the communication unit can operate in either the trunking communication system or the cellular communication system.

What is claimed is:

1. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, wherein at least some of a plurality of communication units are located within the geographic region, and wherein the at least some of the plurality of communication units are affiliated with the at least one trunking communication system and are operable in either the at lest one trunking communication system or the at least one cellular communication system, a method for locating a particular communication unit of the at least some of the plurality of communication units within the geographic region, the method comprises the steps of:
 a) transmitting, by a communication channel controller of the at least one trunking communication system, a location request message to the particular communication unit;
 b) upon receiving the location request message, transferring affiliation of the particular communication unit from the at least one trunking communication system to the at least one cellular communication system;
 c) transmitting, by the particular communication unit, a location message on a control channel of a cell within the at least one cellular communication system;
 d) transferring the location message from the at least one cellular communication system to a communication channel controller of the at least one trunking communication system, and
 e) determining, by the communication channel controller, the particular communication unit's location based upon the cell of the at least one cellular communication system wherein the particular communication unit transmitted the location message.

2. In a geographic region that contains at least one trunking communication system and at least one cellular communication system, wherein the at least one trunking communication system and the at least one cellular communication system have substantially overlapping coverage areas, wherein at least some of a plurality of communication units are located within the geographic region, and wherein the at least some of the plurality of communication units are affiliated with the at least one trunking communication system, a method for locating a particular communication unit of the at least some of the plurality of communication units within the geographic region, the method comprises the steps of:
 a) transmitting a location request message to the particular communication unit;
 b) transferring affiliation of the particular communication unit from the at least one trunking communication system to the at least one cellular communication system, wherein, once the particular communication unit is affiliated with the at least one cellular communication system, the particular communication unit obtains identifying information regarding a cell of the at least one cellular communication system that the particular communication unit is located;
 c) transferring affiliation of the particular communication unit from the at least one cellular communication system to the at least one trunking communication system, when the particular communication unit has obtained the identifying information;
 d) determining location of the particular communication unit based on the identifying information.

3. In a geographic region that contains at least one trunking communication system and at least one cellular communication system, wherein the at least one trunking communication system and the at least one cellular communication system have substantially overlapping coverage areas, wherein at least some of a plurality of communication units are located within the geographic region, and wherein the at least some of the plurality of communication units are affiliated with the at least one trunking communication system, a method for a particular communication unit of the at least some of the plurality of communication units to transmit its location to a communication channel controller of the at least one trunking communication system, the method comprises the steps of:
 a) receiving a location request message;
 b) transferring affiliation from the at least one trunking communication system to the at least one cellular communication system;
 c) obtaining identifying information regarding a cell of the at least one cellular communication system that the particular communication unit is located;
 d) transferring affiliation from the at least one cellular communication system to the at least one trunking communication system, when the identifying information is obtained;
 e) transmitting the identifying information such that the communication channel controller determines the location of the particular communication unit based on the identifying information.

* * * * *